United States Patent [19]

Cohen

[11] Patent Number: 5,080,688

[45] Date of Patent: Jan. 14, 1992

[54] COLORED PLASTIC LENS REDUCING VISUAL NOISE FOR VDT VIEWERS

[76] Inventor: Michael L. Cohen, 8807 Daimler Ct., Potomac, Md. 20854

[21] Appl. No.: 480,933

[22] Filed: Mar. 15, 1990

Related U.S. Application Data

[62] Division of Ser. No. 811,741, Dec. 20, 1985, Pat. No. 4,911,546.

[51] Int. Cl.$^5$ ............................ D06P 3/60; D06P 5/00; C09B 67/00
[52] U.S. Cl. ........................................... 8/506; 8/490; 8/519; 8/607; 8/638; 351/44; 351/165
[58] Field of Search .................... 8/519, 506, 519, 638, 8/506, 519, 638

[56] References Cited

U.S. PATENT DOCUMENTS

| | | | |
|---|---|---|---|
| 2,409,356 | 10/1946 | Hutchings | 351/165 |
| 3,729,427 | 4/1973 | Louderback | 252/300 |
| 4,286,957 | 9/1981 | Le Naour-Séné | 8/471 |
| 4,320,939 | 3/1982 | Mueller | 351/44 |
| 4,599,272 | 7/1986 | Ichikawa | 428/412 |
| 4,838,673 | 6/1989 | Richards et al. | 351/44 |

*Primary Examiner*—A. Lionel Clingman
*Attorney, Agent, or Firm*—Lalos & Keegan

[57] ABSTRACT

A lens reduces eye strain and fatigue due to glare, after images, reflections or other visual noise incident upon an observer of a visual display terminal. The lens includes a light transmitting plastic body having a convex shaped outer surface for deflecting stray angular radiation and a body provided, in combination with, an ultraviolet absorber to block the transmission of ultraviolet radiation, a colored dye to diminish the intensity of any fluorescent light incident upon the lens and to diminish the transmission of either or both green color radiation or yellow color radiation through the lens and a grey dye to reduce the transmission of incident light.

19 Claims, No Drawings

COLORED PLASTIC LENS REDUCING VISUAL NOISE FOR VDT VIEWERS

This is a division of application Ser. No. 06/811,741 filed Dec. 20, 1985 U.S. Pat. No. 4,911,546.

INTRODUCTION

This invention relates generally to means and methods for reducing visual noise generating glare and eye strain in the eye of an observer. More particularly the present invention relates to the reduction of this visual noise typically found in a working environment for operators of visual display terminal which, if not alleviated, causes harmful glare and eye strain and temporary losses in visibility as in decreased visual acuity.

BACKGROUND

In this day of expanded use of video display terminals in almost every conceivable workplace, there are vast numbers of VDT operators who have reported, through the results of several field surveys, an eye strain and fatigue that leads to ocular discomfort and transient visual impairment. These physiological effects, which may have been initially overlooked, have now been found to lead to time loss, inefficiencies and extended rest periods that decrease the significant advantages attained through the use of the expensive VDTs. While some observers, concerned over these problems, initially thought the origin of the discomfort was solely due to the radiation, intensity or contrast, displayed on the screen of the VDT, it has been found that the image produced on the VDT is not the sole, if even the significant, culprit.

When the visual display terminal was first brought to the workplace its functions and capabilities were heralded to the extent that little thought was given to the environment of the VDT. For instance, in the majority of workplaces the VDT sits atop a desk or other workplace for which the lighting was designed for work at the traditional desk top. This illumination in offices and other workplaces is derived from the conventional light sources, windows and reflections from a variety of objects and surfaces that also includes the operator. The positioning of the VDT in the workplace under these conditions did not take into consideration that the VDTs differ from most other work objects or surfaces in that they have luminance and emit light as well. All VDTs usually have a highly specular curved transparent surface positioned in a more or less vertical plane. Reflections from this mirror-like front surface of the screen form images as do reflections from luminance of windows and other objects. These reflections can produce rays of light forming apparent images of far or near objects such as keyboards, desk tops, walls, clothing, reflection of windows or other luminaries to produce a distinct glare over portions of the screen resulting in a reduction in the contrast and visibility of the display characters.

Long experience makes it quite apparent that extraneous lighting and reflections may cause visual problems for video display terminal operators. The reflection of a lamp or a bright window or colorful wearing apparel upon any viewing screen renders it difficult or impossible to comfortably view the image on the screen. No one who has ever watched television or worked at a VDT, microfilm viewer or similar display device has not had similar visual difficulties Visual problems also arise due to the VDT being an illuminated light source. Operators may encounter difficulty in successfully viewing a VDT screen and other direct or indirect light sources having luminances much different from that of the screen, For instance, if an operator looks toward a window and then looks back towards the screen several visual difficulties may occur. First, discomfort may be caused by the large differences in luminance between the screen and the window, and second, the visibility of the display image may be reduced for several seconds as the visual system of the operator adapts from high luminance of the window to the much lower luminance of the VDT screen. This is referred to as the transient adaptation effect and is particularly important when a positive contrast display is used.

Though temporary visibility loss is due to transient adaptation in VDT operations, it occurs not only, when the operator looks alternately between the glare source and the display screen, but also will occur if a secondary lighting is used on a source document along with viewing the VDT screen. This transient adaptation is a temporary loss of visibility that occurs at any time when an operator changes his point of regard to surfaces having different luminances, or when the illumination changes occur naturally in the visual environment.

The loss is particularly noticeable when a positive contrast display is utilized along with a negative contrast source document, such as typewritten page. A temporary reduced visibility of the display images can also be caused by a scattering of light within the eye which reduces contrast at the retina or by the specula reflections that produce reflected glare over the display image. VDT images, appear to the eye of the observer to be located somewhat behind the screen, rather than at its surface. The accommodative and convergence systems of the eye may fluctuate between reflected images on the surface of the screen and the display image, usually resulting in an intermittent or constant blur of the display characters This accommodative response is known as the time required to shift eye fixation and focus between near and far objects, and thus, bears significantly on visual acuity particularly after several hours of VDT work that includes transient changes in these near points of accommodation and convergence.

It has also been found that differences in task characteristics in various VDT related work have an effect on the visual acuity of the operators. For example, operators who spend a large portion of their time viewing the screen may experience more difficulty with reflected images and screen glare than do data entry operators whose job is typically less screen intensive. Data entry operators, however, may experience more difficulty with luminance differences among the source document, screen and background.

Environment lighting conditions that project light radiation toward the surface of a VDT screen using a cathode ray tube, are found to be reflected from the inside phosphor surface in a diffused manner without imaging the radiation. This incident light from external sources may excite the phosphor increasing its luminance and noticeably reducing contrast making viewing more difficult.

All these reflected images, not only produce a reduction in contrast with the display images, but also have been found by many operators to produce an ocular discomfort and visual impairment. Ocular complaints of workers have often been discussed in terms of eye strain and visual fatigue. These terms, however, are vaguely defined and do not correspond to known physiological or clinical conditions though glare is recognized universally to be undesirable.

Glare, as it used throughout this invention, is the sensation produced by luminances within the visual field that are sufficiently greater than the luminance to which the eyes are adapted to cause annoyance, discomfort or loss of visual performance and acuity. The magnitude of this sensation of glare depends on factors such as the size, position and luminance of the light source or reflected surface, the number of light sources and the luminance to which the eyes are adapted. Reflected glare is the result of specular reflections from polished or glossy surfaces or diffused reflections that produce a veil of light that reduces contrast. Disability glare may be caused by light scattered within the eye, thereby reducing contrast at the retina, or by reflected glare to reduce visual performance and temporary loss of visibility. Discomfort glare produces discomfort and it may, but does not necessarily, interfere with visual performance or visibiltiy, just as disability glare may or may not be accompanied by discomfort.

A lighting environment that is properly designed and therefore comfortable for workers performing traditional desk top tasks may not be comfortable for workers involving VDTs. The design of general office lighting assumes a depressed line of sight toward the lower working surface such as a table or desk. To the contrary, a VDT screen is viewed along the line of sight that is at or near the horizontal. This higher line of sight required to view the screen brings luminaries such as ceiling, walls, windows, closer to the line of sight resulting in a higher glare index and a greater likelihood of discomfort glare.

It is also apparent that reflections from the front surface of a VDT screen reduce the contrast and thus the visibility of the display image. Such reflections can also act as additional visual targets which may promote fluctuations in accommodation and convergence. Positive contrast may tend to make the pupil larger thereby reducing visual acuity or contrast sensitivity, increasing the blur circle and permitting greater spherical aberration. Reflections of ambient lighting by a VDT screen can cause a significant loss of character contrast on the screen. It has become apparent that two distinctively different types of reflection may occur, first, the specular reflection from the front glass surface of the CRT, and second, a diffuse reflection from the scattering of incident light upon the phosphor surface of the CRT. To date there are no accepted standardized procedures to measure either of these disturbing problems.

It is these reflections that are derived from ambient or environmental conditions that are included in the term "visual noise" and are the source of the eye strain and visual fatigue of the operators.

In addition to these reflections that produce visual noise, viewers of visual display terminals using a CRT have visual difficulties due to "after images", which are also a form of, and are included within the meaning of the term visual noise. Through the study of the physiology of the eye, much is learned about the origin of these after images. It is known through the Young-Helmholtz theory of color vision that there is present in the retina of the eye three separate and distinctly different photoreceptors, each detecting and transmitting a different signal to visual cortex to enable the eye to sense and the observer to visualize different colors.

This sensing is known to involve a chemical process in which the protein rhodopsin is selectively bleached in the presence of particular wavelengths of light defining, for example, red, blue and green wavelengths. The bleaching is one of the pigments of rhodopsin sensitive to that particular wavelength of incident light While this bleaching is temporary, and the pigment is reformed inversely related to the intensity of the illumination of the sensitive color, the remaining pigments of the photoreceptors can produce an after image of a complementary color when the eye is directed to a brightly lighted surface.

At times this phenomenon of the eye can be enjoyed as a curious amusement, but for operators of a CRT in which the indicia is typically green, yellow or white, there is no joy in experiencing these after images as they may continually form upon the brightly lighted source document On the contrary, these continually presented after images become annoying and lead to eye strain and fatigue.

OBJECTS OF THE INVENTION

The present invention has as its principal object the reduction of visual noise that results in eye strain for an observer of a visual display terminal.

More particularly the present invention has as an object the provision of a lens to be worn by an observer of a visual display terminal that reduces ocular discomfort in the form of eye strain and visual fatigue due the the visual noise generated from ambient luminances that reflect from the CRT or its environment as well as those after images derived from the indicia on the CRT screen.

A further object of the invention is the provision of a lens to be worn by the observer of a VDT in order to avoid the eye strain and fatigue due to the various wave lengths of the radiation incident upon the eye.

It is a further object of the present invention to provide a method for reducing eye strain on the eye of the observer of a visual display terminal by blocking or significantly reducing the undesirable components of the radiation incident upon the eye of the observer.

It is a further object of the present invention to provide a method for producing a lens for wear by an observer of a visual display terminal A still further object of the present invention is to provide a method for producing a lens by contacting the lens with suitable ultraviolet blockers and dyes while forming the lens in a geometric shape to achieve the desired visual effect and optionally to add an antireflective coating of $SiO_2$.

SUMMARY OF INVENTION

A lens to be worn for the reduction of eye strain and fatigue due to glare, after images, reflections or other visual noise incident upon an observer of a visual display terminal. The lens includes a light transmitting plastic body having a convex shaped outer surface for deflecting stray angular radiation and a body provided, in combination with, an ultraviolet absorber to block the transmission of ultraviolet radiation, a colored dye to diminish the intensity of any fluorescent light incident upon the lens and diminish the transmission of either or both green color radiation and yellow color radiation through the lens and a grey dye to reduce the transmission of incident light.

A method for producing the lens which includes providing a plastic body that may be cellulose acetate, cellulose acetate butyrate or allyl diglycol carbonate and having a geometric shape to conform to a $+1-+8$ diopter front convex surface to deflect any of the specular radiation and thereafter contacting the lens with an ultraviolet radiation blocker composition to enable the lens to block 85-100% of the ultraviolet component of incident light, contacting the lens with a red dye or a blue dye or a combination thereof forming a rose dye, which dye sufficient to provide a deposit for the lens to block 10-40% either or both of the green light and yellow light incident upon the lens and also contacting the lens with a neutral grey dye to deposit sufficient neutral grey dye to provide a capability to block 20-30% of the white light incident upon the lens. A flesh colored dye and an antireflective coating of $SiO_2$ are optional.

DESCRIPTION OF THE PREFERRED EMBODIMENT

To overcome the ravaging effect of the glare from reflection of various luminances, it was found that lens when suitably treated and formed could- be worn by the observer so as to substantially block the form of visual noise produced by the spectral light and other environmental luminances. This invention is also concerned with the radiation that emanates from the interior of the cathode ray tube or other VDT that forms after images. It is primarily to the multiple effect of the environment upon the surface of the VDT and other objects, such as the source document viewed by an observer, or any other source of luminance that this invention is directed. Filters, if provided in front of the VDT, would not in any way reduce that effect of the reflections from the environment, and hence, would do nothing to alleviate the eye strain and fatigue from the environmental luminances that these reflections would produce.

The lens material is preferably in the form of a plastic body of a clear light transmitting material in which the plastic may be made of conventional light transmitting plastic lens blanks composed of materials such as cellulose acetate (CA), cellulose acetate butyrate (CAB), and allyl diglycol carbonate (ADC). Other materials such as clear acrylic compositions could be useful although the dyeing of these lenses is more difficult. The ADC lens may be vacuum formed by "sagging" or formed by molding. It has been found that the sagged ADC lens is more economical and easier to impregnate.

It has been found that the shape of the lens should be convex outwardly as it faces the VDT screen and preferably have an internal concave surface as the lens faces the eye of the observer. The purpose of the convex surface of the lens is to deflect angled stray radiation that may not be on a direct line between the eye of the observer and the screen, thus such stay angled radiation would be deflected off to the side and not enter the eye. In order to achieve this deflection of the stray radiation, it is preferable that the outer or front surface of the lens have a $+1-+8$ diopter curvature and preferably $+4-+6$ diopter curvature.

The components of the visual noise that have been found to cause the eye strain and fatigue include the ultraviolet light having a wave length generally between 250 and 400 nm and portions of the visible spectrum generally between the 500 and 600 nm range that includes the wavelengths of the green and yellow radiation.

Significant improvement in reduction of eye strain comes from removal of all, or substantially all, of the ultraviolet light radiation, preferably 97-100% removal, but at least 85-100% should be absorbed.

There are several ultraviolet absorbers or blockers known but the one that is found to be particularly useful is sold under the trademark "UVINUL-D 50" which is a 2,2',4,4' tetrahydroxybenzophenone and sold by BASF of Parsippany, New Jersey. Of course, any other ultraviolet absorber such as the following benzophenones:2,-4 dihydroxy-; 2-hydroxy-4 methoxy; 2,2'-dihydroxy-4-4'-dimethoxy-;2-hydroxy-4-methoxy . . . -5-sulfonic acid; and disodium 2-2' dihydroxy-4-4'dimethoxy 5-5' disulfo-, can be used as well as ethyl-2-cyano-3,3-diphenyl acrylate, 2-ethylhexyl-2-cyano-3,3-diphenyl acrylates for the acrylic plastic bodies.

The CA or CAB lens body may be coated or impregnated with the ultraviolet blocker simply by dipping the lens in an aqueous bath of slightly soluble ultraviolet blocker at a bath temperature of 130°-250° F., and preferably 140°-160° for CA or CAB lenses and more preferable about 130° for a CA and CAB lens for a time broadly between 1 second and 20 minutes and more particularly between 1 and 250 seconds, or 1-30 seconds and about 15 seconds most preferable for the CA or CAB lens and 10-20 minutes for the ADC lens. When the lens is removed it will have an impregnation of the ultraviolet absorber sufficient to block substantially all of the ultraviolet radiation that would otherwise have been transmitted.

If a sagged allyl diglycol carbonate (ADC) lens is used, the bath temperature should be from 190°-250°, preferably about 210° F. for a time between 0.5 and 10 minutes preferably about 1-2 minutes, if the ADC lens is molded the times may be at least 10 times longer than for the impregnation of the sagged lens blank.

It is particularly desirable to utilize a dye having either or both a red dye component and a blue dye component that will be able to sustain a) the eye sensitivity to the green color in a CRT display with green indicia and b) to sustain the eye sensitivity to the yellow color in a CRT display with yellow indicia respectively. When both dyes are present, a rose dye results which is capable of sustaining both the green color and yellow color sensitivity and can be used interchangeably with the different CRTs.

It has been found that there is a loss in green sensitivity in the eye of the observer that continues to occur upon continuous viewing of the green indicia on the CRT screen. Use of the rose dye, or at least the red component, for instance, reduces the intensity of the green and therefore diminishes the rate of consumption of the green sensitive chemical component of rhodopsin, the chemical in the retina that senses all colors.

There is a different, but comparable, visual chemical component of rhodopsin for the wave length of the yellow color, which upon continuous viewing bleaches the chemical component of rhodopsin, that would transmit this color to the retina, and therefore, through the optic nerve to the brain. When the intensity of the indicent green or yellow radiation, is lowered, the respective chemical compound of rhodopsin sensitive to that color radiation is not used up to the same extent as if the eye had been viewing these colors in there original intensity. Thus the eye would be able to see the green color or the yellow color, for instance, longer and easier without any eye strain than if no rose dye filter, or appropriate red or blue dye component, would be used. This new rose or component colored filter thus prevents reverse after images that in the case of green indicia on the CRT would be red and would be a cause for eye strain.

When the CRT includes the amber or yellow phosphor to produce a yellow indicia, a blue dye or a blue component of the rose dye, as identified above, acts to attenuate the effect of the incident amber or yellow radiation in the same manner as described above with the green wavelength. The eye is thus able to continue to view the yellow color without the reverse after image that in the case of a yellow phosphor would be a blue after image. The terms "dye", "dye mixture" and "mixture" as used are to be used interchangeably with each other. The dyes used herein are disperse dyes that form dye mixtures or dye dispersions as a bath with water.

The plastic lens body may be coated or impregnated with the rose dye or the blue or red component forming the rose dye, either independently, or at the same time. The red dye component utilitized is composed of the following dye mixture:

| | Dye | Colour Index No. | Colour Index Vol. 2 Pg. No. |
|---|---|---|---|
| 88.0% wt | Eastman Brilliant Fast Red 2B-GLF | C.I. Disperse Red 137 | 2624 |
| 6.6% wt | Eastman Polyester Red B, 150% | C.I. Disperse Red 88 | 2604 |
| 5.4% wt | Eastman Polyester Yellow 6GT | C.I. Disperse Yellow 99 | 2525 |

The red dye as described above is a typical example of an appropriate red dye. However, there are many other dyes that would be suitable, for instance, any of the Disperse Red dyes as outlined in the Colour Index would be suitable. The foregoing identification of the composition of the red component dye is a particular example of dye that is believed to provide the most suitable results but in fact any one of the long list of Disperse Red dyes would be useful.

This red dye is mixed with water, and preferably distilled water, to form a bath having a composition in a range from, in the broadest aspects, 3:1 to 20:1 or more desirably 6:1 to 8:1 water to dye ratio with 6:1 being preferable. The bath is preferably at a temperature of about 190°, but may range in temperature from 180°-210° F., or more broadly 150° lens is about 15 seconds to a broader range of 2-150 seconds, or 10-25 seconds and in its broadest aspects about 1 second to 20 minutes. Times within the ranges given are for the CA or CAB or acetate lenses and for the ADC or carbonate lens disclosed. The acetate lenses are found to be more easily impregnated and therefore lower dwell times are suitable while the carbonate lens is more difficult to impregnate and requires the longer times.

For the blue component dye to be used with the red dye to form the rose dye or independently to block a portion of the yellow radiation emanating from the CRT utilizing yellow phosphors it has been found that the typical blue dye that would be useful is any one of the polyester blue dyes produced by Eastman Kodak and, in fact, any one of the Disperse Blue dyes in the Colour Index would be suitable.

A particular blue dye composition found to be useful in this invention is the following:

| | Dye | Colour Index No. | Colour Index Vol. 2 Pg. No. |
|---|---|---|---|
| 92.3% wt | Eastman Polyester Blue GLF, 150% | C.I. Disperse Blue 27 | 2675 |
| 6.2% wt | Eastman Polyester Blue BLF | C.I. Disperse Blue 77 | 2691 |
| 1.5% wt | Eastman Polyester Yellow 6G-LSW | C.I. Disperse Yellow 88 | 2519 |

It has been found that should the blue dye be combined with the red dye to form the a rose colored dye mixture the chronology of the application of the dye to the lens is not critical. The weight concentration of the dye in water is optimally 6:1 water to dye ratio but may be 6:1 to 8:1 and or broadly 3:1 to 20:1 water to dye.

The bath is preferably heated to a temperature of about 190°, but may range in temperature from 180°-200° F. or more broadly 150°-210° F. and the bath or dip dwell time for a sagged ADC lens is about 15 seconds to a broader range of 2-150 seconds, or 10-15 seconds and in its broadest aspects about 1 second to 20 minutes. Times within the ranges given for the acetate lenses and for the carbonate lens disclosed. The acetate lenses, as has previously been stated, are easier to impregnate.

To impregnate the plastic lens body with the grey neutral density dye, the following grey mixture of dyes and may be referred to sometimes as a "grey neutral density dye" is preferred.

| | Dye | Colour Index No. | Colour Index Vol. 2 Pg. No. |
|---|---|---|---|
| 79.5% | wt EK Polyester Black OBL | | |
| ⌈ 48.3% | EK Polyester Blue BLF | C.I. Disperse Blue 77 | 2691 |
|   39.2% | Novilene Violet RL | C.I. Disperse Violet 28 | 2649 |
| ⌊ 12.5% | EK Dk. Orange RL, 150% | C.I. Disperse Orange 37 | 2549 |
| 13.17% | wt EK Polyester Blue BLF | C.I. Disperse Blue 77 | 2691 |
| 7.14% | wt EK Polyester Dk. Orange RL, 150% | C.I. Disperse Orange 37 | 2549 |
| .19% | wt EK Polyester Yellow 2R | C.I. Disperse Yellow 86 | 2518 |

The grey neutral density dye as described above is a medium density grey dye and is a typical example of an appropriate grey neutral density dye. However there are many other dyes that would be suitable. For instance, any of the combination of disperse dyes that would be able to produce a black dye would be suitable. The particular identification of the composition of the grey neutral density dye as given above is merely a typical dye to achieve the medium density grey.

They grey neutral density dye is mixed with water, and preferably distilled water, to form a bath having a composition in the range from, in its broadest aspects, 3:1 to 20:1, or more desirably, 6:1 to 8:1 water to dye weight ratio with 6:1 being preferable. The bath is preferably a temperature of about 190° F., neutral density grey dye, the following mixture of disperse dyes is preferred: for a sagged ADC lens is about 15 seconds to a broader range of 2 to 150 seconds, or 10 to 25 seconds, and in its broadest aspects, about 1 second to 20 minutes. Times within the ranges given are for the acetate lenses and for the carbonate lens disclosed. As previously stated the acetate lenses are found to be more easily impregnated with the grey neutral density dye.

It is an optional feature of the present invention to include a flesh colored dye of the following composition:

| Dye | Colour Index No. | Colour Index Vol. 2 Pg. No. |
| --- | --- | --- |
| 35.7% wt EK Brilliant Fast Red 2B-GLF | C.I. Disperse Red 137 | 2624 |
| 33.8% wt EK Polyester Blue BLF | C.I. Disperse Blue 77 | 2691 |
| 30.5% wt EK Polyester Yellow 6GT | C.I. Disperse Yellow 99 | 2525 |

The flesh colored dye as described above is a typical example of an appropriate flesh colored dye. There are, however, many dyes that would be suitable. For instance, any of the combinations of Disperse Red, Disperse Blue and Disperse Yellow that would provide a flesh colored dye would be suitable. The flesh colored dye is preferably mixed with distilled water to form a bath having a composition in the range from, in its broadest aspects, 3:1 to 20:1, or more desirably, 6:1 to 8:1 water to dye weight ratio with 6:1 being preferable. The bath is preferably a temperature of about 190° F., but may range in temperature from 180°-200° F., or more broadly, 150°-210° F., and the bath or dip swell time for a sagged ADC lens is about 15 seconds to a broader range of 2 to 150 seconds, or 10 to 25 seconds, and in its broadest aspects, about 1 second to 20 minutes. Times within the ranges given are for the acetate lenses and for the carbonate lens disclosed.

It is an optional feature of the present invention that the lens so treated with the foregoing dyes may be subjected to a conventional vapor deposition of SiO₂ or quartz. The antireflection coating on the lens is used to reduce both specular and diffuse reflections and is a desirable, but not critical, element of the present invention.

The lens composed as described has the unique capability of being used with a video display terminal and a CRT with either green or yellow character indicia without the observer experiencing the eye strain that would normally accompany viewing such screen whether the discomfort is due to visual noise related to glare, reflections or after images.

When the observer dons a lens of the type described, the ultraviolet radiation is blocked from at least 97%-100% of the incident ultraviolet radiation but at least 85% of the ultraviolet will be absorbed. The use of the colored filter that absorbs 10%-40% of the visible light incident upon the lens which is in the 500-600 nm wavelength range reduces the visual noise by essentially eliminating the after images that would be formed due to green light derived from a green character indicia CRT or yellow light emitted from a CRT having yellow phosphors that produce yellow character indicia. Both of these wavelengths can be absorbed in the amount of 10-40% through the use of a rose dye. However if either the green wavelength or the yellow wavelength is alone considered to be of concern then the colored filter may be limited to a red component or the green character indicia while a blue component of the dye would be sufficient to reduce the radiation from a yellow character indicia CRT. Use of both dyes simultaneously in the lens simply allows the lens to be used interchangeably with different CRTs. The lens having the grey density filter impregnated into the plastic body reduces the transmission of the white light incident upon the lens and thus passing to the eye by 20%-30%. A flesh colored dye when added to the filter does provide the capability of toning the transmitted light to a more pleasing tone. However the use of a flesh colored dye is found to be optional.

The total of the reductions of the visible light transmitted through the lens to the eye of the observer should be no more than 40% and preferably between about 20% to 40%. Due to the +1 to +8 diopter curvature of the lens and preferably a +3 to +5 diopter curvature, the lens is capable of diverting or deflecting stray radiation that would otherwise enter the eye. The entire lens is preferably coated with an antireflective coating of SiO₂ or quartz to further minimize any specular or diffuse reflections entering the eye after incidence upon the lens.

A specific example of the present invention is as follows: A lens blank that has been sagged or vacuum formed into the shape of a lens having approximately a +4 diopter curvature is made from the plastic allyl diglycol carbonate. The lens is first impregnated with an ultraviolet absorber known under the trademark UVINUL-D 50 which is a 2,2',4,4' tetrahydroxybenzophenone sold by BASF. This benzophenone is formed into an aqueous bath having a ratio of about 6:1 distilled water to the benzophenone. The bath is heated to approximately 210° F. and the lens is dipped into the bath for a dwell time of about 90 seconds. It is removed and washed in distilled water and prepared for the next bath.

A rose dye composed of a red dye with a composition of 88.0% wt Eastman Brilliant Fast Red 2B-GLF, 6.6% wt Eastman Polyester Red B, 150%, 5.4% wt Eastman Polyester Yellow 6GT, and blue dye of the following composition—92.3% wt Eastman Polyester Blue GLF, 150%, 6.2% wt Eastman Polyester Blue BLF, 1.5% wt Eastman Polyester Yellow 6G-LSW—are mixed together in an aqueous bath at a concentration of about 6:1 distilled water to dye. The bath is heated to about 190° F. and the lens is dipped into the bath for a dwell time of about 15 seconds and removed and rinsed with distilled water.

The lens is then prepared for the dye treatment with the neutral density grey dye having the following composition: 79.5% wt a black polyester dye (composed of EK Polyester Blue BLF, Novilene Violet RL EK Dk. Orange RL, wt EK Polyester Blue BLF, wt EK Polyester Dk. Orange RL, wt EK Polyester Yellow 2R.

The dye bath is prepared at a concentration of 6:1 by weight distilled water to dye and then the bath is heated to a temperature of about 190° F. The lens is permitted to be dipped into the bath so prepared for a dwell time of approximately 15 seconds and removed and rinsed with distilled water. An optional flesh colored dye of the following composition is then used to treat the lens. 35.7% wt EK Brilliant Fast Red 2B-GLF, 33.8% wt EK Polyester Blue BLF, 30.5% wt EK Polyester Yellow 6GT. The dye is prepared at the same 6:1 distilled water to dye weight ratio and the bath heated to 190° F and the lens dipped into the bath for a dwell time of about 15 seconds. The lens is removed and rinsed and dried.

Thereafter, it is optional but found to be desirable the lens is subjected to a conventional vacuum deposition of $SiO_2$ or quartz in order to provide an antireflective coating.

The lens so treated is now able to be formed into either a conventional clip-on type lens or could be inserted into a common conventional eye glass frame for use by the viewer.

It is believed that the foregoing description discloses the details of the present invention and the scope of the invention should be limited solely by the following claims in which

I claim:

1. The method of producing a lens for wear by a user to avoid eye strain generated by visual noise, said method comprising:
   providing a plastic body forming a light transmitting lens having a geometric shape including a front surface of a +1 to +8 diopter curvature,
   applying to said lens an aqueous ultraviolet radiation absorber composition or dispersion which causes said lens to block 85 to 100% of ultaviolet component of incident light,
   applying to said lens a colored dye mixture which causes said lens to block 10-40% of incident light having a 500-600 nm wavelength, said colored dye mixture comprising an aqueous dispersion of red disperse dyes or of blue disperse dyes or of red and blue disperse dyes, and
   applying to said lens a grey mixture of dyes which causes the lens to block 20-30% of incident which light, said grey dye comprising a dispersion of at least one or more of the group selected from black, blue, violet, orange, and yellow disperse dyes.

2. The method of claim 1 wherein said ultraviolet radiation absorber composition in solution and is brought into contact with said lens for a time period of 1 second to 20 minutes.

3. The method of claim 1 wherein said ultraviolet radiation absorber is brought into contact with said lens for a time period of 1 second to 20 minutes at a temperature of 130°-250° F.

4. The method of claim 1 wherein said ultraviolet radiation absorber composition is brought into contact with said lens for a time period of 1 second to 250 seconds at a temperature of 140°-160° F.

5. The method of claim 1 wherein said ultraviolet radiation composition brought into contact with said lens for a time of about 1-30 seconds and at a temperature of 140°-160° F.

6. The method of claim 1 wherein said colored dye mixture comprises a red disperse dye and a blue disperse dye forming a rose colored dye dispersion, and said rose colored dye dispersion is brought into contact with said lens for a time period of 1 second to 20 minutes.

7. The method of claim 1 wherein said colored dye mixture includes a red disperse dye, said being brought into contact with said lens for a time period of 1 second to 20 minutes at a temperature of 150°-250° F.

8. The method of claim 1 wherein said colored dye includes a blue disperse dye mixture, said colored blue mixture forming said dispersion brought into contact with said lens for a time period of 1 second to 20 minutes and at a temperature of 150°-250° F.

9. The method of claim 1 wherein said colored dye mixture includes a red disperse dye and a blue disperse dye forming a rose colored dye dispersion, said rose colored dye dispersion being brought into contact with said lens for a time period of 2-150 seconds and at a temperature of 180°-200° F.

10. The method of claim 1 wherein said grey dye is brought into contact with said lens for a time period of 1 second to 20 minutes.

11. The method of claim 1 wherein said neutral grey dye is brought into contact with said lens for at a temperature of 150°-250° F.

12. The method of claim 1 wherein said grey mixtures of dyes is brought into contact with said lens for a time period of about 1 second to 20 minutes at a temperature of 150°-250° F.

13. The method of claim 1 wherein said grey mixture of dyes and is brought into contact with said lens for a time period of about 1-25 seconds and at a temperature of 170°-200° F.

14. The method of claim 1 further comprising forming an antireflective $SiO_2$ coating on the surface of said lens,
   said ultraviolet radiation absorber being brought into contact with said lens for time period of 1 second to 20 minutes,
   said colored dye mixture including a red disperse dye and a blue disperse dye forming a rose colored dye dispersion, said rose colored dye dispersion being brought into contact with said lens for a time period of 1 second to 20 minutes, and
   said grey mixture of dyes forming said dispersion being brought into contact with said lens for a time period of 1 second to 20 minutes.

15. The method of claim 6 further comprising forming an antireflective $SiO_2$ coating on the surface of said lens,
   said ultraviolet radiation blocker being brought into contact with said lens for a time period of 1 second to 20 minutes and at a temperature of 130°-250° F., and
   said colored dye dispersion being brought into contact with said lens for a time period of 1 second to 20 minutes and at a temperature of 150°-250° F.

16. The method of claim 6 further comprising forming an antireflective $SiO_2$ coating on the surface of said lens,
   said ultraviolet radiation absorber being brought into contact with said lens for a time period of about 10-250 seconds and at a temperature of 140°-160° F.,
   said rose dispersion dye being brought into contact with said lens for a time period of 2-150 seconds and at a temperature of 180°-250° F., and
   said grey mixture of due forming said dispersion being brought into contact with said lens for a time of about 1-15 seconds and at a temperature of 170°-250° F., said plastic body being selected from the group consisting of cellulose acetate, cellulose acetate butyrate and allyl diglycol carbonate.

17. The method of claim 1 wherein said plastic body is selected from the group consisting of cellulose acetate, cellulose acetate butyrate and allyl diglycol carbonate.

18. The method of claim 1 further comprising forming an antireflective $SiO_2$ coacting on the surface of said lens.

19. The method of claim 1 wherein said ultraviolet radiation absorber comprises a benzophenone.

* * * * *

UNITED STATES PATENT AND TRADEMARK OFFICE
CERTIFICATE OF CORRECTION

PATENT NO. : 5,080,688

DATED : January 14, 1992

INVENTOR(S) : Michael L. Cohen

It is certified that error appears in the above-identified patent and that said Letters Patent is hereby corrected as shown below:

Column 11
Claim 1, line 18:     delete "which" insert -- white --.

Claim 2, line 2:      delete "in solution and".
Column 12
Claim 7, line 2:      after "said" insert -- colored dye mixture --.

Claim 8, line 1:      after "dye" insert -- mixture --.
        line 2:       delete "mixture".
        line 2:       after "colored" insert -- dye --.
        line 2:       delete second occurrence of "blue".
        line 3:       after "dispersion" insert --    being --.

Claim 12, line 1:     delete "mixtures" insert -- mixture --.

Claim 13, line 2:     delete "and".

Claim 15, line 8:     after "said" insert -- rose --.

UNITED STATES PATENT AND TRADEMARK OFFICE
CERTIFICATE OF CORRECTION

PATENT NO. : 5,080,688

DATED : Jaunaury 14, 1992

INVENTOR(S) : Michael L. Cohen

It is certified that error appears in the above-identified patent and that said Letters Patent is hereby corrected as shown below:

Column 12, line 8, claim 16, after "rose" insert --colored dye --.

line 8, claim 16, after "dispersion" delete "dye"

line 11, claim 16, delete "due" insert -- dyes --.

Column 14, claim 18, line 2, delete "coacting" insert --coating --.

Signed and Sealed this

Twenty-second Day of June, 1993

Attest:

MICHAEL K. KIRK

Attesting Officer      Acting Commissioner of Patents and Trademarks